United States Patent
Georgi

(10) Patent No.: US 9,488,365 B2
(45) Date of Patent: Nov. 8, 2016

(54) SAFETY ENHANCING PET COLLAR DEVICE

(71) Applicant: Tina Georgi, Brooklyn, NY (US)

(72) Inventor: Tina Georgi, Brooklyn, NY (US)

( * ) Notice: Subject to any disclaimer, the term of this patent is extended or adjusted under 35 U.S.C. 154(b) by 0 days.

(21) Appl. No.: 14/627,261

(22) Filed: Feb. 20, 2015

(65) Prior Publication Data

US 2016/0245500 A1 Aug. 25, 2016

(51) Int. Cl.
*G08B 23/00* (2006.01)
*F21V 33/00* (2006.01)
*F21L 4/02* (2006.01)
*F21V 23/04* (2006.01)
*F21W 131/30* (2006.01)
*F21Y 101/02* (2006.01)

(52) U.S. Cl.
CPC ............. *F21V 33/0004* (2013.01); *F21L 4/02* (2013.01); *F21V 23/0464* (2013.01); *F21V 33/0052* (2013.01); *F21V 33/0056* (2013.01); *F21W 2131/30* (2013.01); *F21Y 2101/02* (2013.01)

(58) Field of Classification Search
CPC ..... A01K 1/062; A01K 11/008; G08B 21/18
USPC ............ 340/573.3, 573.1; 119/719, 721, 859
See application file for complete search history.

(56) References Cited

U.S. PATENT DOCUMENTS

| | | | |
|---|---|---|---|
| 3,944,803 A | 3/1976 | Chao | |
| 4,173,201 A | 11/1979 | Chao et al. | |
| 5,630,382 A | 5/1997 | Barbera et al. | |
| D417,039 S | 11/1999 | Smith et al. | |
| D422,385 S | 4/2000 | Callaghan | |
| 6,067,018 A * | 5/2000 | Skelton | A01K 11/008 119/721 |
| 6,557,498 B1 | 5/2003 | Smierciak et al. | |
| 6,578,982 B1 | 6/2003 | Lynch | |
| 6,877,889 B2 | 4/2005 | Peng et al. | |
| 6,970,090 B1 * | 11/2005 | Sciarra | A01K 15/023 119/795 |
| 7,140,327 B2 | 11/2006 | Morehead | |
| 7,318,393 B2 * | 1/2008 | Ayscue | A01K 27/006 119/859 |
| 2008/0272920 A1 * | 11/2008 | Brown | A01K 15/023 340/573.3 |
| 2014/0331942 A1 * | 11/2014 | Sarazyn | A01K 29/005 119/719 |

* cited by examiner

*Primary Examiner* — Phung Nguyen

(57) ABSTRACT

A safety enhancing pet collar device enhances visibility, tracks, and monitors surroundings of a pet. The device includes a band having a first end couplable to a second end defining a loop for positioning around a neck of a pet. A plurality of lights is coupled to an exterior surface of the loop. A battery is electrically coupled to each of the lights. A switch is electrically coupled between the battery and each of the lights wherein the lights are illuminated when the switch is in an on position. A light sensor is operationally coupled between the battery and each of the lights to illuminate the lights when the light sensor detects an ambient light level below a threshold level. A transmitter is coupled to the band and operationally coupled to a location detection unit for providing a location of the band to an extrinsic apparatus.

7 Claims, 3 Drawing Sheets

SAFETY ENHANCING PET COLLAR DEVICE

BACKGROUND OF THE DISCLOSURE

Field of the Disclosure

The disclosure relates to collar devices and more particularly pertains to a new collar device for enhancing visibility, tracking, and monitoring surroundings of a pet.

SUMMARY OF THE DISCLOSURE

An embodiment of the disclosure meets the needs presented above by generally comprising a band having a first end couplable to a second end defining a loop for positioning around a neck of a pet. A plurality of lights is coupled to an exterior surface of the loop. A battery is electrically coupled to each of the lights. A switch is electrically coupled between the battery and each of the lights wherein the lights are illuminated when the switch is in an on position. A light sensor is operationally coupled between the battery and each of the lights to illuminate the lights when the light sensor detects an ambient light level below a threshold level. A transmitter is coupled to the band and operationally coupled to a location detection unit for providing a location of the band to an extrinsic apparatus.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
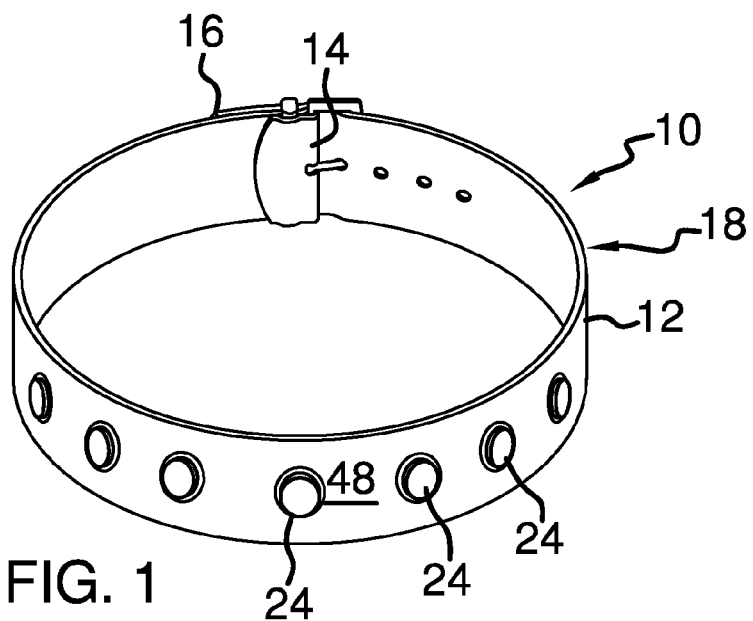
FIG. 1 is a top front side perspective view of a safety enhancing pet collar device according to an embodiment of the disclosure.
Figure 2:
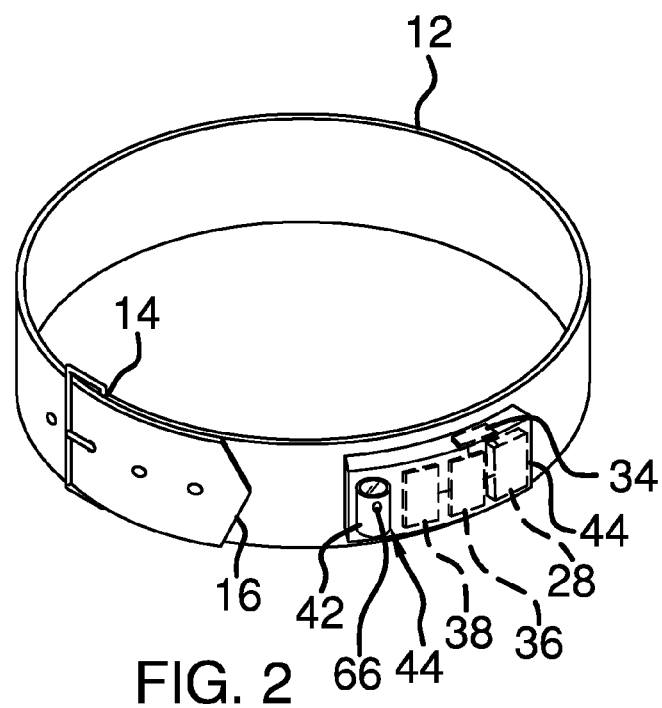
FIG. 2 is a bottom front side perspective view of an embodiment of the disclosure.
Figure 3:
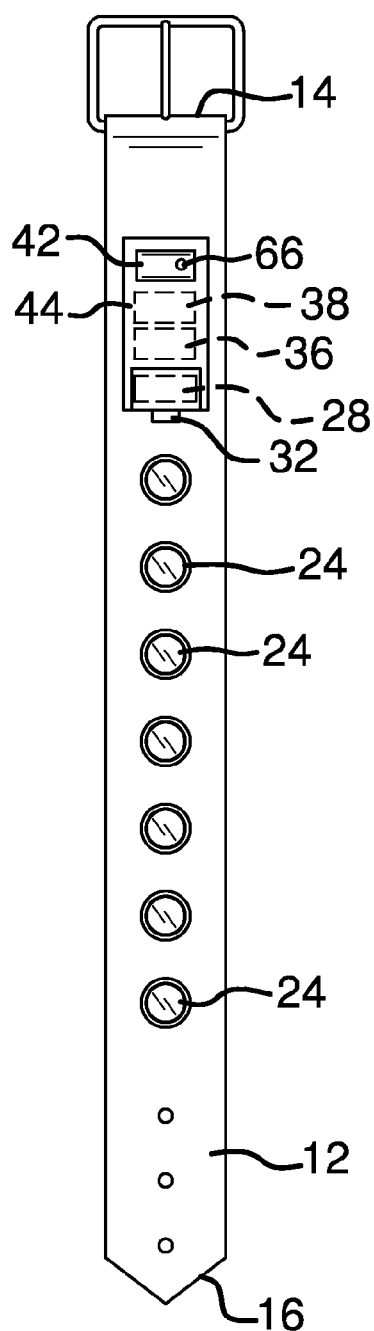
FIG. 3 is a top view of an embodiment of the disclosure in an opened position.
Figure 4:
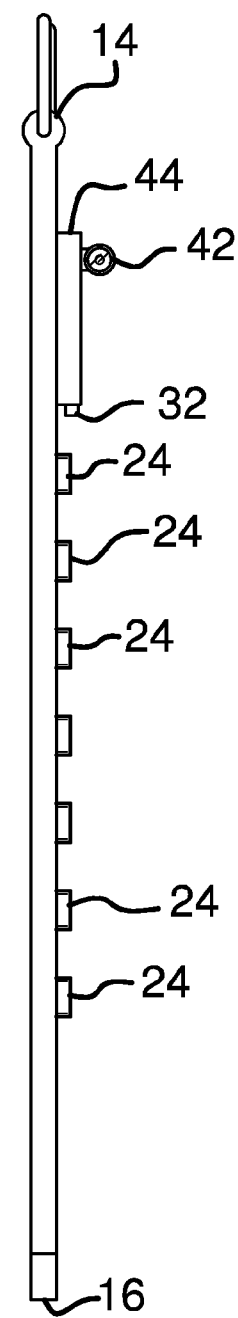
FIG. 4 is a side view of an embodiment of the disclosure in an opened position.
Figure 5:
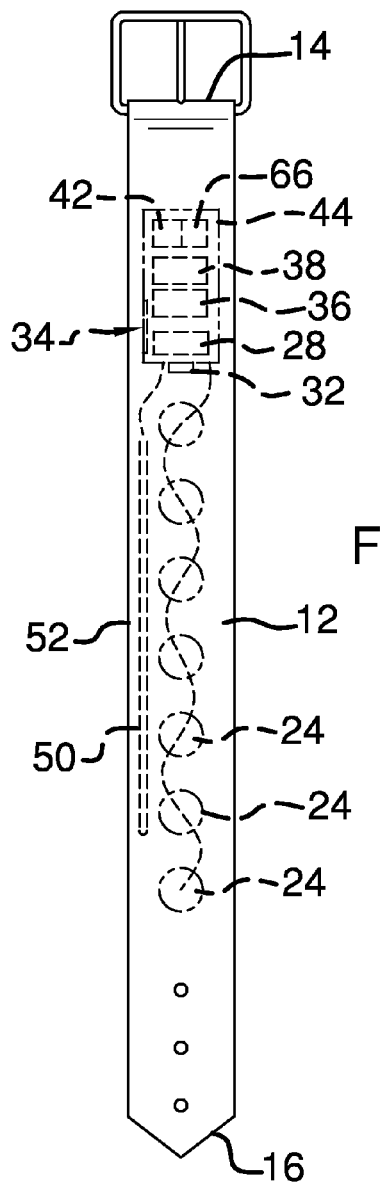
FIG. 5 is a back view of an embodiment of the disclosure in an opened position.
Figure 6:
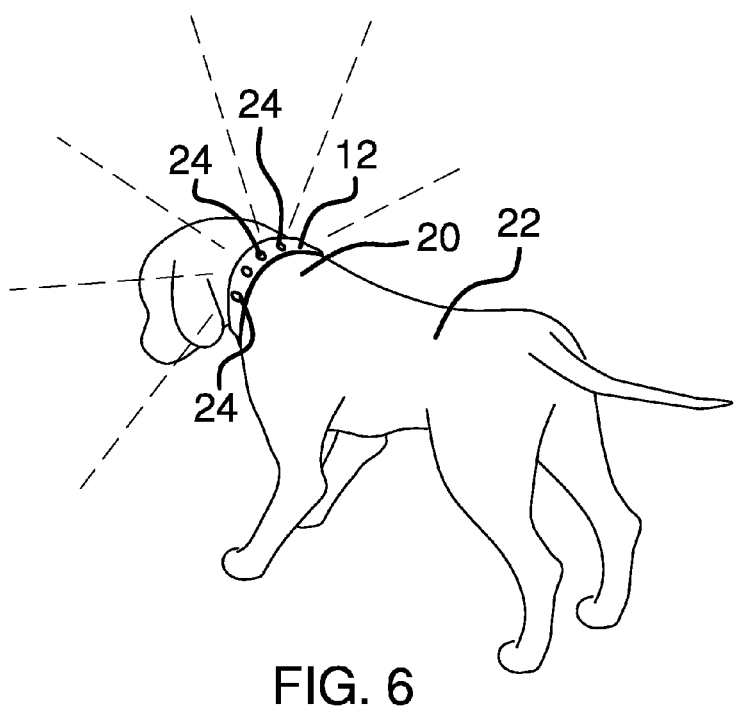
FIG. 6 is a top back side perspective view of an embodiment of the disclosure in use.

With reference now to the drawings, and in particular to FIGS. 1 through 6 thereof, a new collar device embodying the principles and concepts of an embodiment of the disclosure and generally designated by the reference numeral 10 will be described.

As best illustrated in FIGS. 1 through 6, the safety enhancing pet collar device 10 generally comprises a band 12 having a first end 14 couplable to a second end 16 defining a loop 18 wherein the band 12 is configured for being positioned around a neck 20 of a pet 22. It is noted that a conventional band or collar is less appropriate for some breeds, for example pugs, due to the head shape and enhanced potential for tracheal damage due to the physical structure of the pet 22. Thus, it is common for a conventional collar to be replaced by a harness to transfer potential pressure from the neck 20 to the chest or torso of the pet 22. For purposes of this disclosure, the term collar and the band 12 are intended to be defined as all or part of a collar, harness or other similar apparatus conventionally used to restrain or identify the pet 22. Thus, the band 12 may be positioned proximate the neck 20 extending around the pet 22 as well as positioned directly over the neck 20 of the pet 22.

Each of a plurality of lights 24 is coupled to an exterior surface 26 of the loop 18. The lights 24 are evenly spaced along a longitudinal axis of the band 12 and may be light emitting diode type lights. A battery 28 is coupled to the band 12. The battery 28 is electrically coupled to each of the lights 24 by wiring 30 in a conventional manner. The wiring 30 may be fully embedded within the band 12 such that the wiring 30 is not visible when looking at the band 12.

A switch 32 is coupled to the band 12. The switch 32 is electrically coupled between the battery 28 and each of the lights 24 wherein the lights 24 are illuminated when the switch 32 is in an on position. A light sensor 34 is operationally coupled between the battery 28 and each of the lights 24 wherein the lights 24 are electrically coupled to the battery 28 and illuminated when the light sensor 34 detects an ambient light level below a threshold level. Thus, the lights 24 may be automatically illuminated utilizing the light sensor 34 or the switch 32 may be used to illuminate the lights 24 regardless of the ambient light level.

A location detection unit 36 utilizing a global positioning system, radio transmission, or the like, is coupled to the band 12 allowing a location of the pet 22 to be tracked. A transmitter 38 is coupled to the band 12. The transmitter 38 is operationally coupled to the location detection unit 36 wherein the location detection unit 36 is configured for providing a location of the band 12 to an extrinsic device 40 such as a cellular phone, computer, computer tablet, or the like.

A camera 42 is coupled to the band 12. The camera 42 is directed transverse to a longitudinal axis of the band 12. The camera 42 is operationally coupled to the transmitter 38 to transmit images of an area surrounding the pet 22 to the extrinsic device 40. Thus, the camera assists in locating the pet 22 or determining a current condition of the pet 22. Additionally, a microphone 66 may be coupled to the band 12 separate from or integrated into the camera 42. The microphone 66 is operationally coupled to the transmitter 38 to transmit audio detected by the microphone 66 to the extrinsic device 40.

A housing 44 is coupled to the band 12. The transmitter 38 and the battery 28 are each positioned in the housing 44. The camera 42 is coupled to an outer surface 46 of the housing 44 parallel to an exterior surface 48 of the loop 18. Thus, the housing 44 spaces the camera 42 from the band 12 to inhibit the pet 22 from obscuring the view of the camera 42. An antenna 50 is coupled to the band 12 and operationally coupled to the transmitter 38. The antenna 50 is embedded within the band 12. The antenna 50 extends parallel to a lateral edge 52 of the band 12.

In use, the band 12 is coupled to the pet 22 in a conventional manner such as by use of a buckle. The switch 32 is manipulated to illuminate the lights 24 or to allow the light sensor 36 to illuminate the lights 24 automatically to enhance visibility of the pet 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A safety enhancing pet collar device comprising:
   a band having a first end couplable to a second end defining a loop wherein said band is configured for being positioned around a neck of a pet;
   a plurality of lights coupled to an exterior surface of said loop;
   a battery coupled to said band, said battery being electrically coupled to each of said lights;
   a switch coupled to said band, said switch being electrically coupled between said battery and each of said lights wherein said lights are illuminated when said switch is in an on position;
   a light sensor operationally coupled between said battery and each of said lights wherein said lights are electrically coupled to said battery and illuminated when said light sensor detects an ambient light level below a threshold level;
   a location detection unit coupled to said band;
   a transmitter coupled to said band, said transmitter being operationally coupled to said location detection unit wherein said location detection unit is configured for providing a location of said band to an extrinsic apparatus; and
   a camera coupled to said band, said camera being operationally coupled to said transmitter wherein said transmitter is configured for transmitting images captured by said camera to an extrinsic device.

2. The device of claim 1, further comprising a housing coupled to said band, said transmitter and said battery each being positioned in said housing.

3. The device of claim 1, further comprising said camera being coupled to an outer surface of said housing parallel to an exterior surface of said loop.

4. The device of claim 1, further comprising said lights being evenly spaced along a longitudinal axis of said band.

5. The device of claim 1, further comprising an antenna operationally coupled to said transmitter, said antenna being embedded within said band, said antenna extending parallel to a lateral edge of said band.

6. The device of claim 1, further comprising a microphone coupled to said band, said microphone being operationally coupled to said transmitter wherein said transmitter is configured for transmitting audio detected by said microphone to an extrinsic device.

7. A safety enhancing pet collar device comprising:
   a band having a first end couplable to a second end defining a loop wherein said band is configured for being positioned around a neck of a pet;
   a plurality of lights coupled to an exterior surface of said loop, said lights being evenly spaced along a longitudinal axis of said band;
   a battery coupled to said band, said battery being electrically coupled to each of said lights;
   a switch coupled to said band, said switch being electrically coupled between said battery and each of said lights wherein said lights are illuminated when said switch is in an on position;
   a light sensor operationally coupled between said battery and each of said lights wherein said lights are electrically coupled to said battery and illuminated when said light sensor detects an ambient light level below a threshold level;
   a location detection unit coupled to said band;
   a transmitter coupled to said band, said transmitter being operationally coupled to said location detection unit wherein said location detection unit is configured for providing a location of said band to an extrinsic apparatus;
   a camera coupled to said band, said camera being operationally coupled to said transmitter wherein said transmitter is configured for transmitting images captured by said camera to an extrinsic device;
   a microphone coupled to said band, said microphone being operationally coupled to said transmitter wherein said transmitter is configured for transmitting audio detected by said microphone to the extrinsic device;
   a housing coupled to said band, said transmitter and said battery each being positioned in said housing, said camera being coupled to an outer surface of said housing parallel to an exterior surface of said loop; and
   an antenna operationally coupled to said transmitter, said antenna being embedded within said band, said antenna extending parallel to a lateral edge of said band.

* * * * *